No. 607,725. Patented July 19, 1898.
W. H. WORST & C. W. HART.
NUT LOCK.
(Application filed May 14, 1897.)
(No Model.)

Witnesses
Mark L. Byng.
Victor J. Evans

Inventors
Warren H. Worst.
and Charles W. Hart

By John Wedderburn Attorney

UNITED STATES PATENT OFFICE.

WARREN H. WORST AND CHARLES W. HART, OF NOVA, OHIO.

NUT-LOCK.

SPECIFICATION forming part of Letters Patent No. 607,725, dated July 19, 1898.

Application filed May 14, 1897. Serial No. 636,563. (No model.)

*To all whom it may concern:*

Be it known that we, WARREN H. WORST and CHARLES W. HART, of Nova, in the county of Ashland and State of Ohio, have invented certain new and useful Improvements in Nut-Locks; and we do hereby declare the following to be a full, clear, and exact description of the invention, such as will enable others skilled in the art to which it appertains to make and use the same.

Our invention relates to improvements in nut-locks, the object being to provide a novel construction of device of this character which shall be simple in construction, efficient in operation, and cheap to manufacture.

To the accomplishment of this end our invention consists in a nut-lock comprising a slotted ring or washer formed of spring metal and having its inner edge beveled to form a confining edge adapted to engage the grooves between adjoining threads on the bolt, the said nut-lock being applied by separating the split ends thereof and permitting it to contract and surround and engage the bolt by its spring clamping action thereon.

Figure 1:
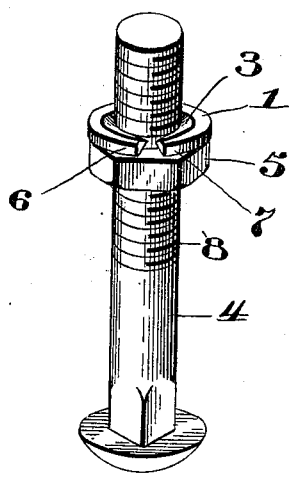
Figure 2:
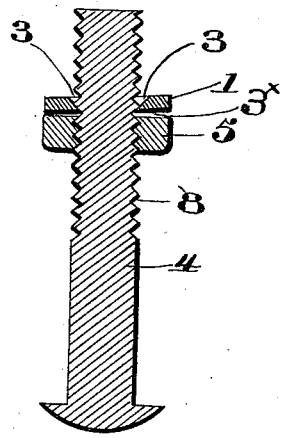
Figure 3:
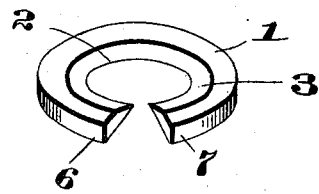

In the accompanying drawings, illustrating the invention, Figure 1 is a perspective view of a bolt with our improved nut-lock applied thereto. Fig. 2 is a longitudinal sectional view of the same, and Fig. 3 is a perspective view of the nut-lock.

In accordance with our invention the nut-lock is constructed of a spring ring or washer 1, formed of spring-steel or other suitable spring metal and having a central opening 2 therein of relatively less diameter than the bolt to which it is to be applied. The inner edge of the split ring or washer is beveled on one side to form an edge 3, adapted to enter the groove between two adjacent threads on the bolt, said edge 3 being in the same plane with the inner surface $3^\times$ on the opposite side of the ring, so that the latter may rest close to the nut 5 to engage the thread which lies nearest to the outer surface of the nut.

In applying the nut-lock to a bolt 4 to confine the nut 5 thereon the ends 6 7 thereof are spread apart by means of pliers or some other suitable tool and placed in position upon the threaded shank 8 of the bolt, and the said ends are then released in order to permit the nut-lock to contract and engage with the bolt by its spring clamping action thereon. When the nut is thus applied, the edge 3 takes within the grooves between adjoining threads, and thereby assists in maintaining the nut-lock in position and prevents longitudinal movement thereof. The two ends 6 7 of the nut-lock split ring or washer are in alinement or coincidence, and when the nut-lock is applied to the bolt the confining point or edge 3 at the base of one end will engage with the groove between two adjoining threads and the confining edge or point at the base of the other end will engage with the next adjoining groove, this action being due to the inclination of the threads, whether extending right or left.

A nut-lock thus constructed is simple and efficient in operation and may be manufactured at a small cost. This clamping action of the bolt is positive, and it cannot be loosened by working loose of the nut or the vibration of the rail parts due to the passing of trains.

Having thus described our invention, what we claim as new, and desire to secure by Letters Patent, is—

In combination with a bolt and nut of a split ring or washer, of relatively less diameter than the bolt and having one side of its inner edge beveled to form the edge 3 in the same plane with the opposite plain side $3^\times$ of the ring thus adapting the latter to closely abut the nut.

In testimony whereof we have signed this specification in the presence of two subscribing witnesses.

WARREN H. WORST.
CHAS. W. HART.

Witnesses:
  H. L. WITHERSTINE,
  L. G. BROWN.